United States Patent [19]
Kontz

[11] 3,873,661
[45] Mar. 25, 1975

[54] METHOD OF BLOW MOLDING AND EXHAUSTING A BLOWN ARTICLE THROUGH THE SAME BLOW NEEDLE
[75] Inventor: Robert F. Kontz, Toledo, Ohio
[73] Assignee: Owens-Illinois, Inc., Toledo, Ohio
[22] Filed: May 11, 1973
[21] Appl. No.: 359,413

Related U.S. Application Data
[62] Division of Ser. No. 218,437, Jan. 17, 1972, Pat. No. 3,737,275.

[52] U.S. Cl. ................................ 264/98, 264/102
[51] Int. Cl. ...................... B29c 17/07, B29c 25/00
[58] Field of Search ............ 264/89, 90, 94, 96, 98, 264/99, 102, 92; 425/DIG. 204

[56] References Cited
UNITED STATES PATENTS

| | | | |
|---|---|---|---|
| 2,810,160 | 10/1957 | Bottleman | 425/298 |
| 3,048,891 | 8/1962 | Maass | 425/DIG. 204 |
| 3,089,185 | 5/1963 | Di Settembrini | 264/98 |
| 3,114,931 | 12/1963 | Pelikan | 264/98 |
| 3,198,861 | 8/1965 | Marvel | 264/98 |
| 3,338,998 | 8/1967 | Di Settembrini | 264/94 |
| 3,513,502 | 5/1970 | chambers | 425/192 |
| 3,538,211 | 11/1970 | Adomaitis | 425/DIG. 204 |
| 3,571,848 | 3/1971 | Szajna | 425/290 |
| 3,752,621 | 8/1973 | Shelby | 425/DIG. 204 |

FOREIGN PATENTS OR APPLICATIONS
36-11831    1961   Japan .................................. 264/94

Primary Examiner—Jan H. Silbaugh
Attorney, Agent, or Firm—Philip M. Rice; E. J. Holler; P. M. Rice

[57]    ABSTRACT

One mold half of a blow molding machine carries a slidably mounted hollow blow needle which is driven by air pressure to penetrate the extruded plastic tube after the molds have closed, following which blowing air is supplied through the needle bore to inflate the tube to the shape of the mold cavity. After blowing, the blowing air is exhausted from the blown shape and the blow needle is withdrawn. The valve which controls the supply of needle-positioning and tube blowing pressure is also carried by the mold half, to minimize time lag and pressure drop.

5 Claims, 7 Drawing Figures 3,873,661
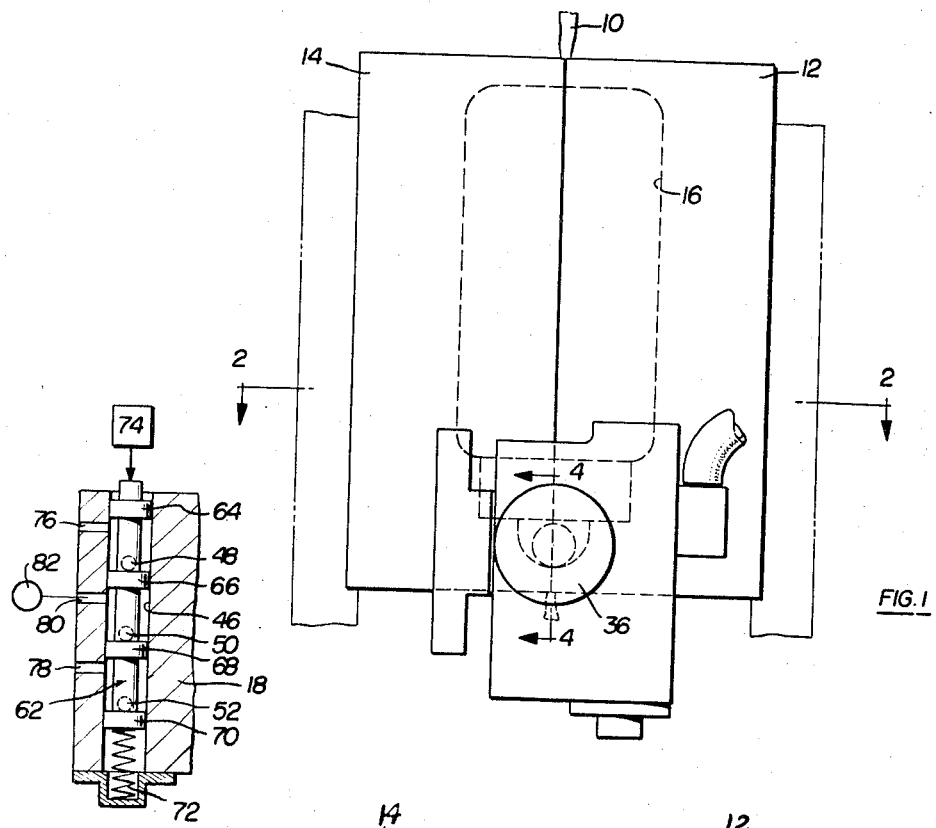
FIG. 1
FIG. 3
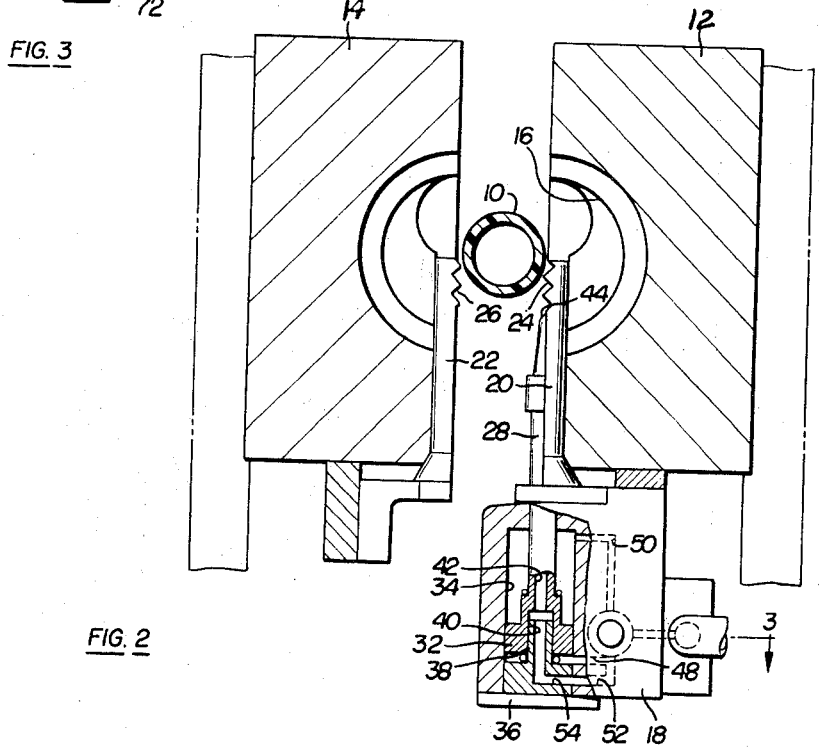
FIG. 2

METHOD OF BLOW MOLDING AND EXHAUSTING A BLOWN ARTICLE THROUGH THE SAME BLOW NEEDLE

CROSS REFERENCE TO RELATED APPLICATION

This is a division of application Ser. No. 218,437, filed Jan. 17, 1972, now U.S. Pat. No. 3,737,275.

BACKGROUND OF THE INVENTION

The present invention is particularly adapted for use in high speed blow molding machines, an example of which is disclosed in the copending commonly assigned application of Criss and Pollitt entitled "Method and Apparatus for Blow Molding Plastic Articles," Ser. No. 835,091, filed June 20, 1969, now U.S. Pat. No. 3,652,751. In high speed blowing systems, a considerable portion of the time required for a blowing cycle is consumed by the chilling of the blown plastic article. Heat must be removed from the hot extrusion after it is blown into its final shape within the mold cavity, so that the blown article will be rigid enough to maintain its blown shape without deformation or damage after it is removed from the mold.

To accelerate this cooling, the mold may be cooled or even refrigerated. The cooling will be further enhanced if the blown article is maintained firmly in contact with the cold mold cavity wall for the maximum possible time during the blowing operation. Maximum contact time is facilitated by achieving maximum blow pressure at the earliest possible moment after the mold is closed, and maintaining such pressure within the blown article until immediately prior to opening of the mold, when the blown article is rapidly exhausted of the blowing air.

SUMMARY OF THE INVENTION

The blowing or inflation of the extrusion may be accomplished by a hollow blow needle which penetrates one wall of the extruded plastic tube within the mold cavity, to permit air to be injected through the needle into the interior of the plastic tube. Effective blowing requires that the needle be driven through the tube with sufficient force to provide a clean opening with minimum leakage. Proper penetration also requires that means be provided for preventing the tube from yielding or being displaced under the impact of the penetrating needle. For example, a dull needle point might tend to merely deflect the tube rather than penetrate it. Premature application of blow pressure to the plastic tube prior to penetration by the needle might also cause the tube to deflect away from the advancing needle.

Hence, it is the principal object of this invention to provide an improved system for supplying and injecting blowing air into the plastic extrusion within the molding cavity.

It is a further object of this invention to provide an air injection system which assures rapid and complete penetration of the plastic extrusion by the blow needle.

It is another object of this invention to provide an air injection system which provides maximum duration of full inflation pressure within the blown object.

It is a still further object of this invention to provide an air injection system which minimizes time lag and pressure drop between the air control system and the mold cavity.

BRIEF DESCRIPTION OF THE DRAWINGS

FIG. 1 is an elevation of a closed two-part blow mold.

FIG. 2 is a cross-section viewed in the direction of arrows 2—2 of FIG. 1, showing the two mold halves slightly separated.

FIG. 3 is a cross-section through the valve body portion of the structure of FIG. 2, viewed in the direction of arrows 3—3 of FIG. 2.

DETAILED DESCRIPTION OF THE INVENTION

Figure 4:
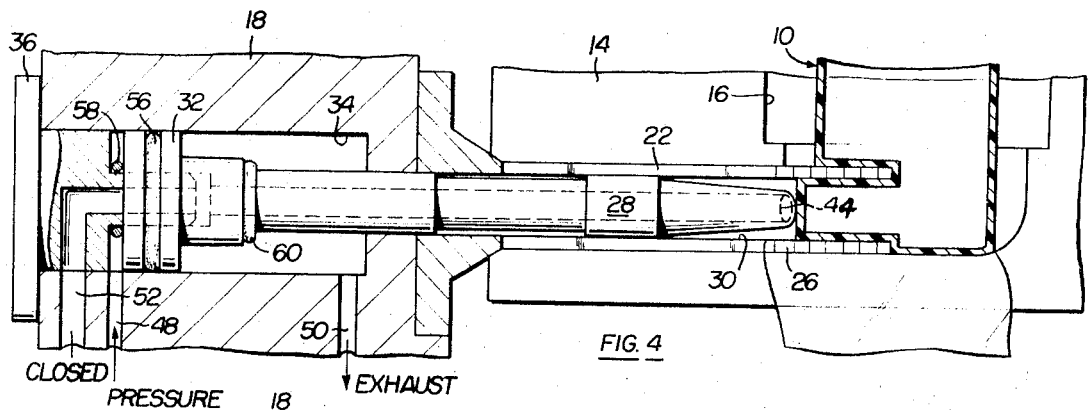
FIGS. 4 through 6 are cross-sectional views through the blow needle, viewed in the direction of arrows 4—4 of FIG. 1, and showing the blow needle in three different stages of the blowing cycle.

Referring to FIGS. 1 and 2 of the drawing in particular, an extruded plastic tube or parison 10 is shown projecting from the upper end of closed mold halves 12 and 14 which define cavity 16 which, by way of example, may be adapted to create a plastic bottle when the extruded tube within is inflated and chilled. The mold halves are mounted to swing toward and away from each other by a mechanical drive which may take the form shown in the above mentioned copending application, or as shown in copending application, Ser. No. 216,213, filed Jan. 7, 1972, now U.S. Pat. No. 3,761,212, of Robert Kontz entitled "Overload Arm for Mold." The mold halves may also reciprocate vertically during the blowing cycle. However, the present invention does not relate to such motions, and the corresponding structure has therefore been omitted from the drawings.

A blow needle and valve body 18 is carried by mold half 12 for movement therewith. As best shown in FIG. 2, wherein the mold halves are shown slightly opened, a blow needle guid cylinder 20 is split along its diameter into two separate elements 20,22, one carried by each mold half. The open end of each half of the guide cylinder is provided with opposed gripping faces 24, 26, respectively, which may be toothed or otherwise roughened to assure that the extruded tube 10 will be firmly gripped and held in place during the penetration by the blow needle and the subsequent inflation step. If desired, guide cylinder 20,22 could be formed as one element, carried by mold half 12, except for a split portion at the open end to provide gripping faces 24, 26.

As shown in FIG. 4, blow needle 28 is slidably mounted within bore 30 of guide cylinder 20. The left end of blow needle 28 is enlarged to form piston 32 which moves within guide cylinder chamber 34. The left end of chamber 34 is sealed by a plug 36 on which is formed a concentric axially extending projection 38 which is dimensioned to fit within counterbored seat 40 in blow needle 28. A central longitudinal bore 42 runs the full length of blow needle 28, and the right end of needle 28 is tapered to form a pointed tip 44.

Blow needle and valve body 18 also include a valve bore 46, (see FIGS. 2 and 3) which is connected to guide cylinder chamber 34 by blow passage 48, needle return passage 50 and supplemental needle exhaust passage 52, as will be more fully explained below. An extension 54 of passage 52 is formed within chamber plug 36.

Piston 32 carries a sealing ring 56. Another ring 58 functions to cushion the seating of needle 28 against plug 36, and to maintain the necessary gap between plug 36 and piston 56 to assure application of air pressure to the piston from passage 48. A third ring 60 functions to cushion the seating of needle 28 against the right end of chamber 34, and to seal guide cylinder bore 30 during the blowing step.

Referring to FIG. 3, valve bore 46 of body 18 carries a valve spool 62 having lands 64, 66, 68 and 70. A compression return spring 72 maintains spool 62 in the position shown. Movement of the spool against the compression of return spring 72 is effected by valve control means schematically illustrated at 74.

Valve spool 62 controls and directs air flow between passages 48, 50 and 52 leading to guide cylinder chamber 34 and exhaust passages 74 and 76, and inlet passage 80 leading to a source of air pressure 82.

OPERATION

The operation of the system of this invention will be best understood by reference to FIGS. 4 through 7.

Figure 7:
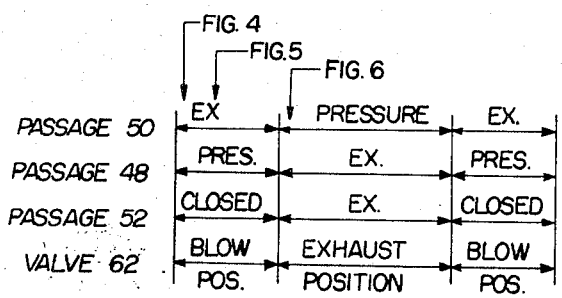
FIG. 7 is a time chart showing the condition of various elements of the blowing system during the blowing cycle.

FIG. 7 is a time chart showing one and a half cycles of the system. The blowing operation begins immediately after mold halves 12 and 14 are closed upon extruded plastic tube 10. Appropriate control means sense the closing of the molds. These control means, schematically illustrated at 74 in FIG. 3, may comprise such elements as cams, limit switches, solenoids or air-operated pilot valves, as will be understood by those skilled in the art.

Thus, the closing of mold halves 12 and 14 initiates shifting of valve spool 62 from its illustrated exhaust position to its blow position, wherein blow passage 48 is connected to inlet passage 80 between valve lands 64 and 66, needle return passage 50 is connected to exhaust passage 78 between lands 66 and 68, and supplemental needle exhaust passage 52 is blocked off between lands 68 and 70.

Thus, at the instant following the shift of valve spool 62 to its blow position, the blow needle 28 will be in the condition shown in FIG. 4. Air pressure applied to the left face of piston 32 from passage 48 will drive the needle 28 toward the right. It is important to note from FIG. 4 that no air pressure can enter blow needle bore 42, since passages 52 and 54 are blocked off at valve 62, and since the internal valve formed by the seating of chamber plug projection 38 within seat 40 of needle 28 blocks communication between passage 48 and bore 42. Thus, all of the available pressure from passage 48 is utilized to impart a driving force to needle 28, to assure rapid and complete penetration of extruded plastic tube 10. Furthermore, the absence of an air stream emanating from needle bore 42 reduces the likelihood of plastic tube 10 being deflected or blown away from the advancing needle.

Figure 5:
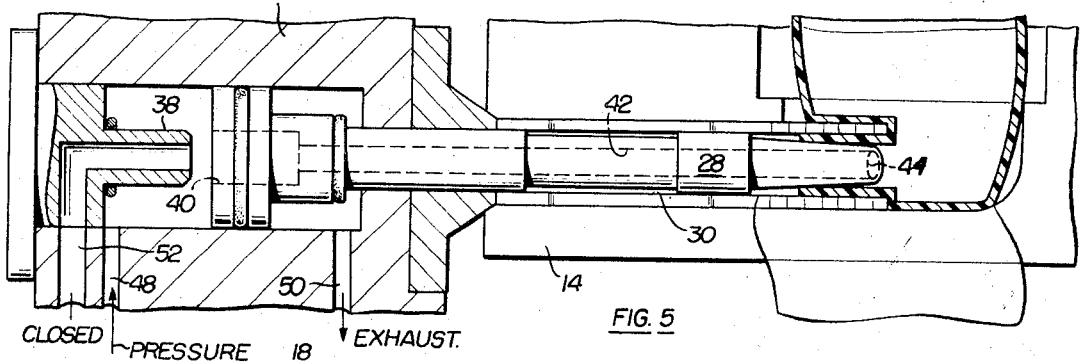

Continued travel of blow needle 28 toward the right ultimately exposes blow needle bore 42 to the pressure from passage 48, as shown in FIG. 5. The axial length of projection 38 is selected so that this will not occur until tip 44 of blow needle 28 has penetrated extruded tube 10. Inflation or blowing of the tube will therefore begin and continue during the remainder of the stroke of blow needle 28. This arrangement thus assures that inflation begins at the earliest possible moment following penetration of the tube by needle 28.

Figure 6:
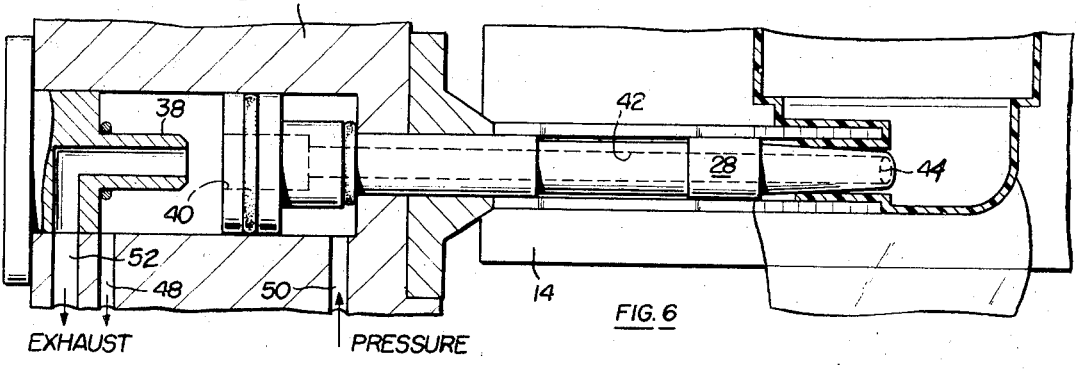

Full blow pressure is maintained until immediately before time for opening mold halves 12 and 14. An appropriate signal to valve control means 74 permits compression spring 72 to return valve spool 62 to its position illustrated in FIG. 3. At this point, air pressure is applied to needle return passage 50 from inlet 80, and passages 48 and 52 are exhausted via exhaust passages 76 and 78, respectively. This condition is illustrated in FIG. 6. Blow needle 28 is thereby driven back toward its withdrawn position.

The pressurized air within the blown object is initially exhausted through blow needle bore 42 and passages 48 and 52. When the internal valve formed by chamber plug projection 38 and seat 40 once again closes, all of the blow air continuing to enter needle bore 42 from the blown object is directed to exhaust through passages 54, 52 and 78. At this point, needle 28 will have withdrawn from the blown object, and some of the pressure remaining within the blown object will exhaust to atmosphere from the punctured tube wall, without entering bore 42 of blow needle 28.

Thus, the provision of two exhaust passages, 48 and 54, permit rapid exhausting of the blown object, permitting the maintenance of full blow pressure until the last possible moment.

By placing valve spool 62 immediately adjacent blow needle 28, substantially instantaneous response is facilitated, without significant time lag or pressure drop. This further enlarges the time during which full blown pressure may be maintained within the blown article.

It will be understood that the internal valve formed by chamber plug projection 38 and seat 40 in blown needle 28 could be formed in the reverse of the illustrated version, that is, the male projection 38 could be formed on the end of piston 32, while the counterbored seat or female portion 40 could be formed in chamber plug 36. The operation described above would remain unchanged.

This invention may be further developed within the scope of the following claims. Accordingly, the above specification is to be interpreted as illustrative of only a single operative embodiment of this invention, rather than in a strictly limited sense.

I now claim:

1. In a method of blow molding, comprising the steps of:

simultaneously (1) forming a blowable shape by closing a pair of blow mold halves defining a blow mold cavity onto a plastic tubular parison and (2) gripping the tubular parison in a piercing region with a pair of gripping surfaces carried by respective blow mold halves to define a cylindrical passage communicating with the blowable shape and having a radial wall;

introducing pressurized air against a rear flanged region of a blow needle having an axial bore, initially preventing the pressurized air from flowing through the needle axial bore, and advancing the needle relative to the blow mold cavity toward the blowable shape to pierce said radial wall and to project through said passage toward said blowable shape;

injecting the pressurized air through the needle bore for flow into said shape immediately after but only after said needle has pierced said radial wall to blow the shape to the configuration of a blown article conforming to the size and shape of the blow mold cavity;

maintaining full blow pressure within the blow mold cavity for a time interval to (a) fully inflate the blowable shape to the configuration of the mold cavity, (b) maintain the plastic material in firm contact with the mold cavity walls, and (c) enhance the cooling the blown article; and simultaneously retracting said blow needle and rapidly exhausting blow air from the blown shape through the needle bore.

2. The method as defined in claim 1, further including venting the exhausting air from the needle to atmosphere initially through two exhaust ports and then, after the needle has partially retracted, through a single exhaust port.

3. In a method of blow molding a plastic article, the steps of:

simultaneously (1) forming a blowable shape by closing a pair of blow mold halves defining a blow mold cavity having the shape of the article onto a plastic tubular parison and (2) pinching shut a portion of the parison immediately adjacent said cavity to define a cylindrical passage communicating with the blowable shape and having a radial wall;

advancing a blow needle having an axial bore toward said blowable shape (1) to pierce said radial wall and (2) to project through said passage toward said blowable shape;

injecting pressurized air through the needle bore for flow into said shape immediately after but only after said piercing step to blow the shape of the configuration of a blown article conforming to the size and shape of the blow mold cavity;

maintaining full blow pressure within the blow mold cavity for a time interval to (a) fully inflate the blowable shape to the configuration of the mold cavity, (b) maintain the plastic material in firm contact with the mold cavity walls, and (c) enhance the cooling of the blown article; and simultaneously retracting said blow needle and rapidly exhausting blow air from the blown shape through the needle bore.

4. The method as defined in claim 3, characterized by utilizing a single source of air pressure to effect the advancing and injecting steps.

5. The method defined in claim 3, further including venting the exhausting air from the needle to atmosphere initially through two exhaust ports and then, after the needle has partially retracted, through a single exhaust port.

* * * * *